United States Patent [19]

Vanderwerf

[11] Patent Number: 4,561,740

[45] Date of Patent: Dec. 31, 1985

[54] DUAL-MAGNIFICATION REAR PROJECTION LECTERN

[75] Inventor: Dennis F. Vanderwerf, Cottage Grove, Minn.

[73] Assignee: Minnesota Mining and Manufacturing Company, St. Paul, Minn.

[21] Appl. No.: 617,631

[22] Filed: Jun. 6, 1984

[51] Int. Cl.[4] ............................................. G03B 3/00
[52] U.S. Cl. .................................... 353/101; 353/78
[58] Field of Search ............... 353/100, 101, 74–79, 353/22, 23, 24, 44

[56] References Cited

U.S. PATENT DOCUMENTS

| | | |
|---|---|---|
| 2,181,133 | 11/1939 | Katz . |
| 2,238,267 | 4/1941 | Katz . |
| 3,369,450 | 2/1968 | Peters . |
| 3,588,226 | 6/1971 | Ikezu . |
| 3,675,998 | 7/1972 | Wilton . |
| 4,053,208 | 10/1977 | Kato et al. . |
| 4,067,648 | 1/1978 | Spreitzer . |
| 4,119,372 | 10/1978 | Morgan ........................ 353/101 X |
| 4,146,315 | 3/1979 | Pribich . |
| 4,200,367 | 4/1980 | Douglas ................................ 353/78 |
| 4,343,538 | 10/1982 | Astero ............................ 353/101 X |
| 4,436,393 | 3/1984 | Vanderwerf ................. 353/DIG. 3 |

*Primary Examiner*—Harry N. Haroian
*Attorney, Agent, or Firm*—Donald M. Sell; James A. Smith; David W. Anderson

[57] ABSTRACT

A dual-magnification rear screen projector having a fixed projection lens and two auxiliary lenses which may be positioned before and after the projection lens in the light path to change the magnification of the system. The system is parfocal in that none of the lenses need be repositioned axially along the light path to focus the system at either magnification.

6 Claims, 6 Drawing Figures

DUAL-MAGNIFICATION REAR PROJECTION LECTERN

BACKGROUND OF THE INVENTION

1. Field of the Invention

This invention relates to rear screen projectors and particularly those which provide variable magnification.

2. Description of the Prior Art

Rear screen projectors are useful for lecture or demonstration purposes because the lecturer and the audience remain in continual facing relationship and the lecturer may illustrate his discussion with sketches, graphs or writings without being forced to turn his back on the audience as would be necessary with the customary blackboard or overhead projected image.

U.S. Pat. Nos. 2,181,133 and 2,238,267 illustrate lecture desks which include rear projection (back lit) screens facing the audience and permit the lecturer to project images from object stages located atop the desks to the screens for viewing by the audience. Such a system is useful for illustration to large audiences located some distance from the lecturer but cannot conveniently be used with small groups. In addition, the size of the unit makes transportation difficult.

Briefly stated, the present invention provides a lectern which sits atop a conventional conference table and provides a podium type structure from which a standing lecturer may project informational images to an audience seated around the table. The lectern is approximately 1.5 meters wide by 1 meter high and deep and includes a projection screen and optics which produces a 1.60X magnified image, facing the audience, of a transparent object of standard A4 paper size placed upon the upper surface of the lectern.

While the size of the projected image is suitable for most information such as drawings and graphs, the size of the projected image produced by 1.60X magnification is too small to allow typewritten material to be easily read by people in the back of the audience. It is desirable, therefore, to provide additional magnification for typewritten documents so that these documents may be easily read by all portions of the audience.

To provide this additional magnification, the optical system of the lectern should be provided with at least two magnifications, the first of which projects a full sized image of an A4 sheet on a reasonably sized screen and the second of which provides an increased magnification image of a reduced area of the stage, so that fine details of the object can be understood.

The problem with providing dual-magnification is that the lecturer cannot conveniently refocus the optical system of the lectern in switching from one magnification to another because the projection screen is located on the side of the lectern opposite the lecturer and cannot easily be seen.

U.S. Pat. Nos. 3,369,450 and 4,146,315 provide dual magnification by the imposition of an auxiliary lens adjacent the main projection lens in the optical path but both require manual axial movement of the lens system along the optical path to focus the systems at the changed magnifications and, therefore, are not suitable for the lectern described above.

U.S. Pat. Nos. 3,588,226 and 4,067,648 provide dual magnification without requiring refocusing by interchanging two complete projection lens systems when a change in magnification is desired. While this solution might be workable in the proposed lectern, the provision of two complete projection lens systems is less expensive and the transport mechanism necessary to change the entire projection lens systems is necessarily complex.

U.S. Pat. No. 3,675,998 provides a change in magnification without refocusing of the optics by axially repositioning and reversing one of the lens elements of a two lens system. The complexity of the lens transport mechanism is undesirable and the space required for the axial repositioning and reversal of the lens element would probably preclude its use in a lectern of the size described.

SUMMARY OF THE INVENTION

The present invention provides a table-top lectern which produces a complete image of an A4 sized object at a first magnification and which may be switched to a second magnification and remain in focus, without axial repositioning of any of its optical components. The lectern comprises a rear screen projector which conventionally includes along a folded light path a fixed light source, an object plane, fixed condensing lenses, a fixed projection lens and a fixed rear projection screen. The improvement which produces the required magnification change includes a first auxiliary lens movable between positions out of the light path and in the light path between the condensing lens and the projection lens, a second auxiliary lens movable with the first auxiliary lens between positions out of the light path and in the light path between the projection lens and the rear projection screen, and means for simultaneously moving the first and second auxiliary lenses out of and into the light path, the projector providing a first magnification when the first and second lenses are out of the light path and a second magnification when the first and second auxiliary lenses are in the light path, wherein the projector is parfocal in that axial movement of the projection lens is not required for focusing an image at the rear projection screen in response to movement of the auxiliary lenses to achieve the first and second magnifications.

The projector also includes means for reducing the amount of specular glare from the light source and reflected off the stage to the lecturer comprising positioning of the light source offset from the center of the object stage and an asymmetrical annular Fresnel lens which has its center offset from the object stage center in the direction of offset of the light source.

BRIEF DESCRIPTION OF THE DRAWINGS

The present invention will be more thoroughly described with reference to the accompanying drawings wherein like numbers refer to like parts in the several views, and wherein.

DESCRIPTION OF THE PREFERRED EMBODIMENT

Figure 1:
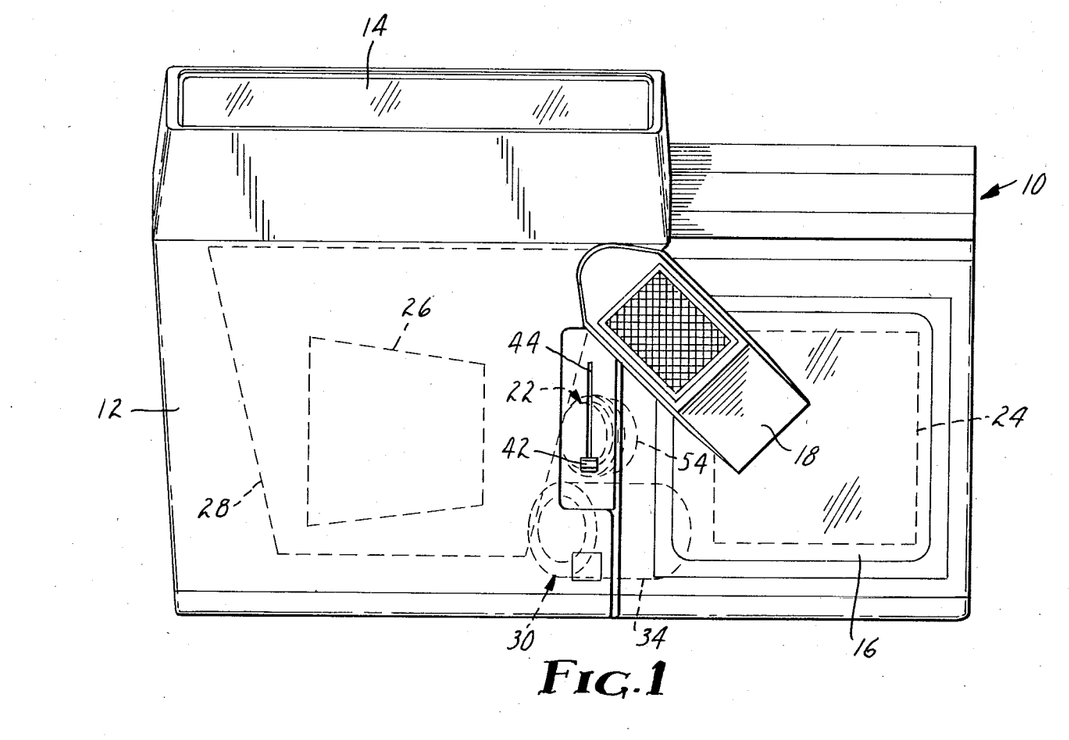
FIG. 1 is a top plan view of a rear projection lectern according to the present invention.
Figure 2:
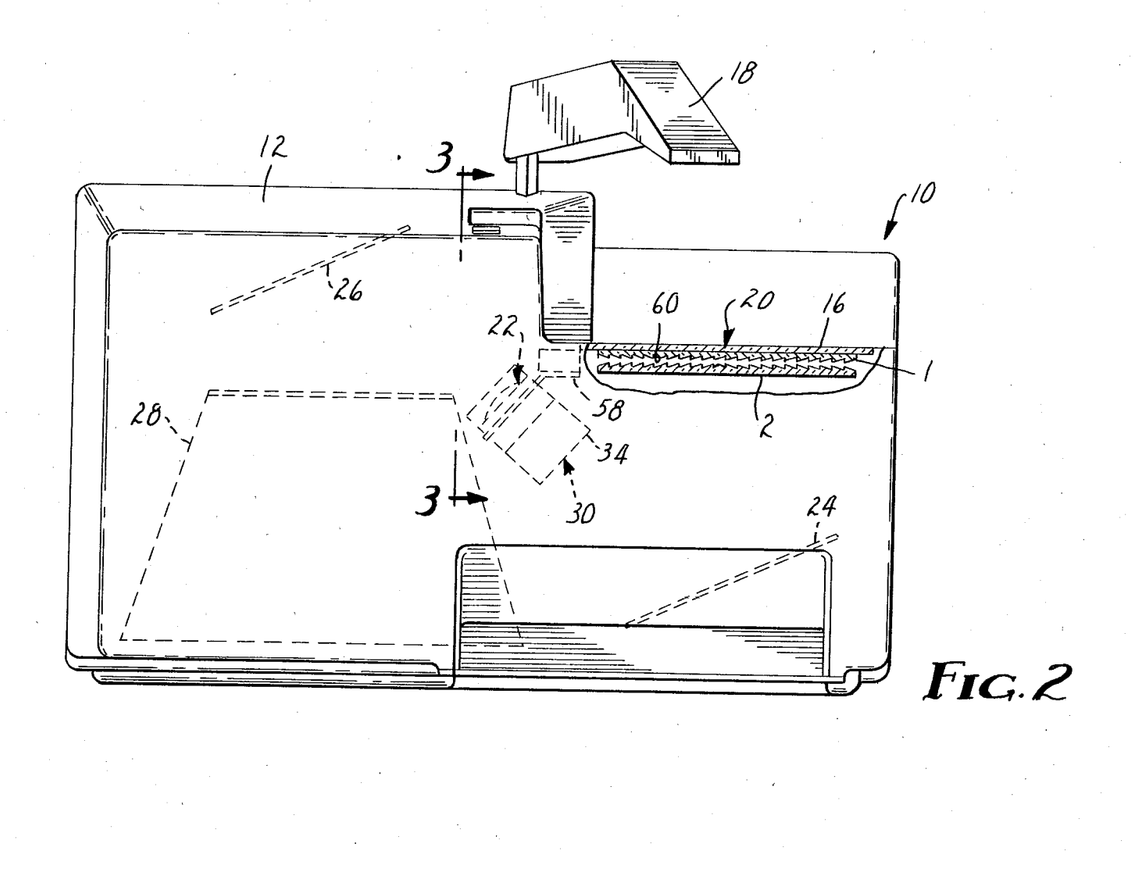
FIG. 2 is a rear elevational view of the lectern of FIG. 1 with a portion broken away to reveal inner details.

FIGS. 1 and 2 illustrate a rear projection lectern, generally indicated as 10, which is adapted to be placed upon a table (not shown) and which is sized to present a podium surface 12 at a convenient height for a lecturer standing at the table and adjacent the lectern 10 in a position which would yield the perspective of FIG. 1.

In addition to the podium surface 12, the lectern 10 includes a rear projection screen 14 which faces an audience seated around the table and upon which images may be projected from a glass object stage 16. By means of a light source 18 and optical elements located within the lectern 10, an image of the indicia included on a transparency (not shown) placed upon the stage 16 is projected onto the screen 14 and may be viewed by the audience seated around the table. "Transparency" includes any slide or slide-like structure which includes a transparent or translucent background and opaque or translucent indicia printed or otherwise transcribed thereon.

In addition to the light source 18, the optical elements of the lectern 10 include a condensing lens system 20, a prime projection lens system 22, and planar mirrors 24, 26 and 28 by which light produced by the light source 18 and focused by the condensing lens system 20 and the prime projection lens system 22 is directed to the rear projection screen 14.

The stage 16 is sized to accept a full A4 size (285 mm×285 mm) transparency and the projection screen 14 is sized to accommodate an image which is 456 mm×456 mm. Thus, to fill the screen 14 with an image of an A4 sized object, the magnification produced by the combination of the condensing lens system 20 and the prime projection lens system 22 is required to be and is preferably 1.60X. A projected image of the described size has been found to be adequate for the projection of relatively large and easily understood indicia such as pictures or graphs, but has not been found to be large enough for the easy comprehension of indicia typewritten on the transparency.

Figure 3:
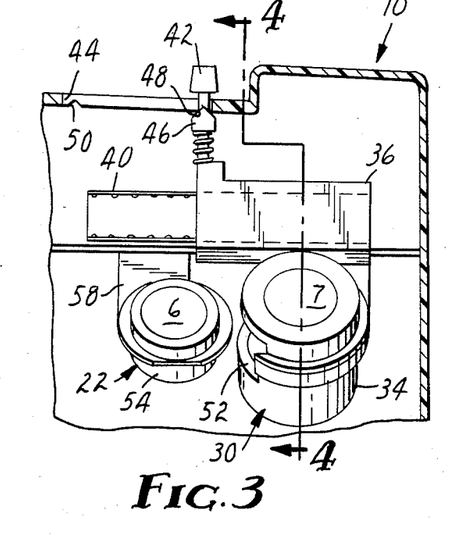
FIG. 3 is a partial, cross-sectional view of the lectern of FIG. 1 taken generally along the line 3—3 of FIG. 2.
Figure 4:
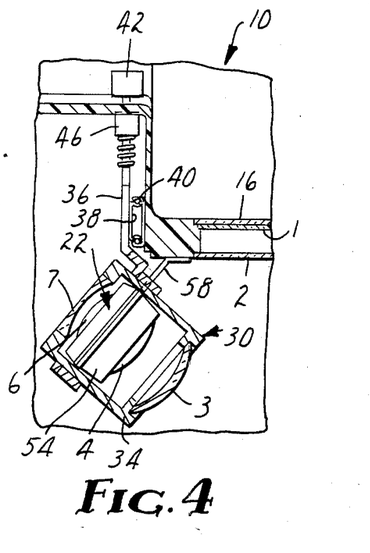
FIG. 4 is a partial, cross-sectional view of the lectern of FIG. 1 taken generally along the line 4—4 of FIG. 3.

In order to increase the magnification of the image projected, and thus allow typewritten indicia to be projected at a size which will allow the information to be read by the entire audience, the lectern 10 is provided with an auxiliary lens structure 30, as best seen in FIGS. 3 and 4, which may be interposed in the light path adjacent the prime projection lens system 22 and which increases the magnification of the transparency image projected on the rear projection screen 14 from the initial 1.60X to approximately 2.40X.

Figure 5:
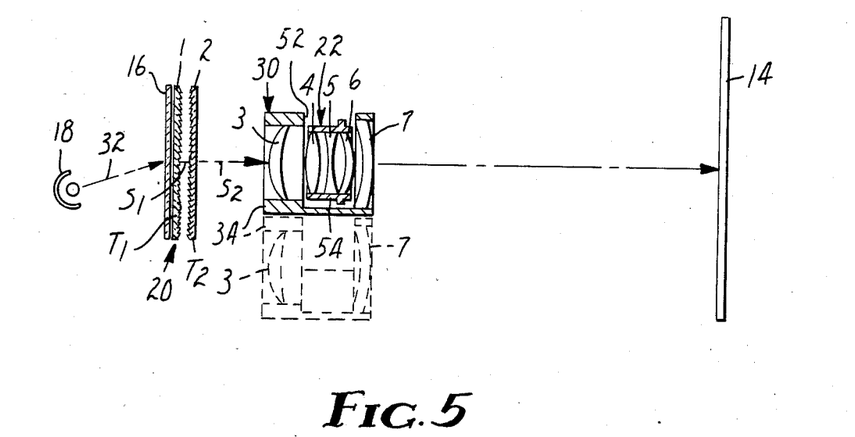
FIG. 5 is a schematic illustration of the optic path and optical elements of the lectern of FIG. 1.

FIG. 5 illustrates the optical elements of the lectern 10 in greater detail and schematically represents the path of light rays emanating from the light source 18 and terminating at the rear projection screen 14, with the mirrors 24, 26 and 28 removed for clarity. FIG. 5 illustrates the auxiliary lens structure 30 interposed in the light path, the position in which the lectern 10 would project its higher magnification image on the screen 14. The alternate position of the auxiliary lens structure 30 is illustrated by phantom lines and is the position in which the auxiliary lens structure 30 is removed from the light path and the lectern 10 displays its lower magnification image upon the rear projection screen 14. Also for clarity the light path 32 is represented by a single light ray passing through the optic center of the optical elements included in the lectern 10.

With the auxiliary lens structure 30 in position to create the higher image magnification, the path 32 of light emanating from the light source 18 successively passes through the object stage 16, which is clear glass or plastic, the condensing lens system 20, a first half of the auxiliary lens structure 30, the prime projection lens system 22, the remaining half of the auxiliary lens structure 30 and finally through the rear projection screen 14 to the audience.

The condensing lens system 20 consists of a first annular Fresnel lens 1 and a second annular Fresnel lens 2 which are manufactured of acrylic optical plastic and include circular grooves to produce positive aspheric lenses. Each of the Fresnel lenses 1 and 2 includes a planar side and a grooved side and are arranged in the optic path 32 such that light emanating from the light source 18 and progressing toward the rear projection screen 14 enters the planar surface of the first Fresnel lens 1 and exits the planar surface of the second Fresnel lens 2. In addition to performing as a condensing lens system, Fresnel lenses 1 and 2 form part of the magnification optic elements, in conjunction with the auxiliary lens structure 30 and the prime projection lens system 22.

The groove frequency of both the first and second Fresnel lenses 1 and 2 is between about two and eight grooves per millimeter and the angles of the individual grooves are derived from the sag equation of a general aspheric surface:

$$Z = \frac{CY^2}{1 + \sqrt{1 - (K+1)C^2Y^2}} + dY^4 + eY^6 \qquad (1)$$

The groove angles are then given by the derivative of this equation (1), which results in the equation:

$$\tan F = \frac{dZ}{dY} = \frac{2YC}{1 + \sqrt{1 - (K+1)C^2Y^2}} + \frac{(K+1)C^3Y^3}{\sqrt{1 - (K+1)C^2Y^2} \, [1 + \sqrt{1 - (K+1)C^2Y^2}\,]^2} + 4dY^3 + 6eY^5 \qquad (2)$$

wherein:
F = Groove angle;
Z = Location on aspheric lens surface parallel to optic axis;
Y = Location on groove surface transverse to optic axis;
C = Curvature of lens vertex;
K = Conic constant;
d = Aspheric coefficient;
e = Aspheric coefficient.

Light exiting Fresnel lens 2 of the condensing lens system 20 next encounters a positive meniscus lens 3 which is convex concave and which is the first lens of the auxiliary lens structure 30.

Figure 6:
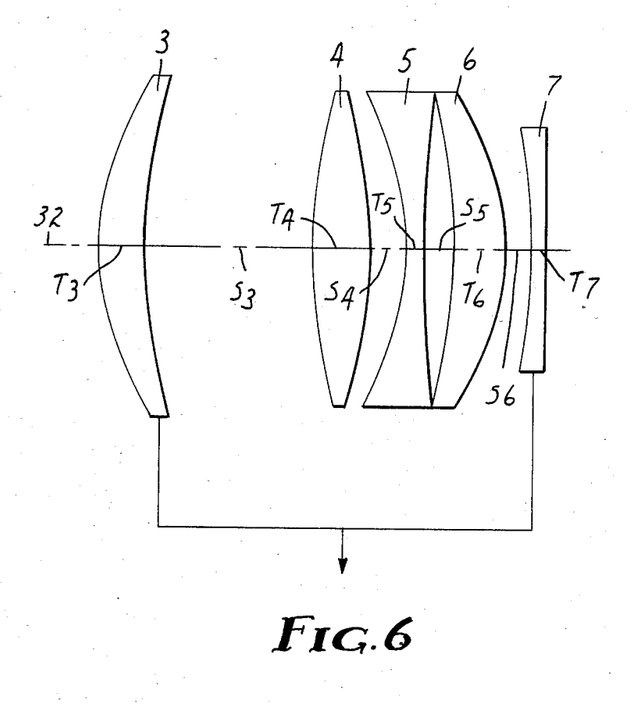
FIG. 6 is a schematic illustration of a portion of the optical elements of the lectern of FIG. 1.

Referring to FIG. 6, which illustrates the auxiliary lens structure 30 and the prime projection lens system 22 in greater detail, the first lens 3 of the auxiliary lens structure 30 is spaced from the first lens 4 of the prime projection lens system 22 an air space $S_3$. The prime projection lens system 22 is a compact triplet lens system commonly used in overhead projectors and consists sequentially along the light path 32 of the first lens 4, which is a bi-convex or double-convex positive lens, a second lens 5 which is a double-concave negative lens and is spaced from the first lens 4 an air space distance $S_4$, and a third lens 6 which is a positive meniscus, concave convex lens which is air spaced from the second lens 5 a distance $S_5$.

Upon exiting the prime projection lens system 22 light along the light path 32 next encounters the remaining half of the auxiliary lens structure 30 which is a negative meniscus, concave convex lens 7 and which is air spaced from the prime projection lens system 22 a distance $S_6$.

Referring again to FIG. 5, light exiting the final lens 7 of the auxiliary lens structure 30 next encounters the rear projection screen 14 where the light is diffused so it may be viewed by the audience. The rear projection screen 14 is preferably of the micro-optical type in which surface irregularities on the order of microns are provided on the surface of a transparent plate. The rear projection screen 14 may also be a dispersion screen, in which a light diffusing layer is formed by dispersing light scattering particles in a binder; a wax screen, in which wax in the form of a sheet is used as a light diffusing layer; or a crystalline polymer screen, in which a crystalline polymer material in the form of a sheet is used as a light diffusing layer. These various types of rear projection screens are well known in the art and are described in great detail in U.S. Pat. No. 4,053,208 issued to Kato et al.

The system thus described provides one magnification when the lenses 3 and 7 comprising the auxiliary lens structure 30 are interposed in the light path 32 between the prime projection lens system 22 and the light source 18 and the prime projection lens system 22 and the screen 14, respectively. Another, lesser magnification is provided when the auxiliary lens structure 30, and consequently its lenses 3 and 7, are removed from the light path 32 as illustrated by the phantom lines of FIG. 5.

Most importantly, the image produced on the screen 14 remains in focus at either magnification, i.e. whether or not the auxiliary lens structure 30 is placed within the light path 32. Thus the lectern 10 is parfocal and does not require the axial repositioning of any of the optical elements when magnification is changed by either inserting the auxiliary lens structure 30 into the light path 32 or removing the auxiliary lens structure 30 from the light path 32. This feature of dual, parfocal magnification is essential to the efficient operation of the lectern 10 because the lecturer is normally positioned opposite the lectern 10 from the projection screen 14 and would not be able to easily view the projected image if refocusing were required.

Insertion and removal of the auxiliary lens structure 30 from the light path 32 is accomplished as illustrated in FIGS. 3 and 4 by mounting the lenses 3 and 7 in a housing 34 which is connected to a support 36 which is in turn connected to the movable track 38 of a ball-bearing carriage 40 mounted to the lectern 10. The support 36 for the auxiliary lens structure 30 is accessible to the lecturer by means of a handle 42 projecting through a slot 44 cut in the surface of the lectern 10 and is positively positioned in either the position wherein the lenses 3 and 7 are out of the light path 32 as shown in FIG. 3 or into the light path 32 by means of a spring loaded detent 46 which engages notches 48 and 50 cut in the lectern 10. The housing 34 for the auxiliary lens structure 30 includes an opening 52 in its side which is adapted to accept a housing 54 containing the prime projection lens system 22 and a bracket 58 mounting the housing 54 to the lectern 10. By means of the opening 52, the housing 34 for the auxiliary lens structure 30 may be rolled along its carriage 40 to a position wherein the auxiliary lens structure housing 34 surrounds the prime projection lens system 22 and positions the lenses 3 and 7 in axial relationship with the prime projection lens system 22 in the light path 32.

A convenience feature for the comfort of the lecturer is incorporated into the lectern 10 and is illustrated by FIGS. 1 and 2 in that the light source 18 is diagonally offset from the center of the stage 16. FIG. 5 also illustrates that the light source 18 is offset from the center of the stage 16, the optical center of the condensing lens system 20, the optical center of the prime projection lens system 22 and the optical center of the rear projection screen 14. If the light source 18 were located over the center of the stage 16, an objectionable glare would be reflected from the stage 16 into the eyes of the lecturer. To redirect the reflection of the light source 18 from the stage 16 away from the lecturer, the light source 18 is offset along a diagonal of the stage 16 so that glare is reflected in a direction to the right of the lecturer as he stands behind the lectern 10. However, light emanating from the light source 18 must be redirected by some means along the optical path through the prime projection lens system 22 and to the rear projection screen 14. This redirection of light from the offset light source 18 is accomplished as shown in FIGS. 2 and 5 by offsetting the center 60 of the first annular Fresnel lens 1 along the same diagonal and in the same direction at which the light source 18 is offset from the center of the stage 16. This decentering of the first annular Fresnel lens 1 causes light exiting the centered, second annular Fresnel lens 2 to be directed vertically toward the mirror 24 and on toward the screen 14 as shown in FIG. 5. A more complete description of the ability of a decentered annular Fresnel lens to redirect light may be found in U.S. Pat. No. 4,436,393 which is assigned to the assignee of the present invention.

In a specific example of the lens assembly of FIG. 5, the respective lens elements art recited in Table 1 together with the corresponding refractive indices N for the D line of the spectrum of each lens, the corresponding dispersive indices V for the D line of the light spectrum of each lens, and the radii of curvature R of each surface of each lens. The surfaces of each lens are listed in sequence and in the same order as the lens surfaces are situated from the light source 18 toward the screen 14 with plus and minus values of R indicating surfaces which are respectively convex and concave to light entering the lens in a direction from the light source 18. The axial thickness T of the respective lens elements, the air spaces S between the lens elements and the effective focal length are also listed. The quantities of the radii, thicknesses, air spacings and focal lengths are expressed in millimeters.

TABLE 1

| Lens | R(mm) | $T_1$-$T_7$ (mm) | $S_1$-$S_6$ (mm) | $N_d$ | $V_d$ | Effective Focal Length (mm) |
|---|---|---|---|---|---|---|
| 1 | Plano | 2.03 | | 1.4913 | 57.8 | 418.12 |
| | * | | | | | |

TABLE 1-continued

| Lens | R(mm) | $T_1-T_7$ (mm) | $S_1-S_6$ (mm) | $N_d$ | $V_d$ | Effective Focal Length (mm) |
|---|---|---|---|---|---|---|
|  |  |  | 17.46 |  |  |  |
| 2 | ** | 2.03 |  | 1.4913 | 57.8 | 362.73 |
|  | Plano |  | 432.40 |  |  |  |
|  | 62.941 |  |  |  |  |  |
| 3 | 127.001 | 8.0 |  | 1.5168 | 64.17 | 231.60 |
|  |  |  | 38.5 |  |  |  |
|  | 112.047 |  |  |  |  |  |
| 4 | −112.047 | 12.55 |  | 1.5225 | 59.48 | 109.32 |
|  |  |  | 7.10 |  |  |  |
|  | −59.440 |  |  |  |  |  |
| 5 | 221.433 | 3.65 |  | 1.5814 | 40.85 | −80.22 |
|  |  |  | 6.818 |  |  |  |
|  | −99.45 |  |  |  |  |  |
| 6 | −50.90 | 11.12 |  | 1.5311 | 62.15 | 181.87 |
|  |  |  | 6.55 |  |  |  |
|  | −71.25 |  |  |  |  |  |
| 7 | −234.048 | 3.0 |  | 1.5168 | 64.17 | −199.59 |

\* Equation (2) in specification where:
$C = -4.868 \times 10^{-3}$
$K = -9.0131 \times 10^{-1}$
$d = 1.41 \times 10^{-10}$
$e = 4.27 \times 10^{-15}$
\*\* Equation (2) in specification where:
$C = 5.611 \times 10^{-3}$
$K = 8.8711 \times 10^{-1}$
$d = -5.18 \times 10^{-10}$
$e = -1.01 \times 10^{-14}$ The lens system described in Table 1 operates at a magnification of 2.40X, has a back focus of 3.331 mm, an object to image distance of 1316.06 mm and an overall effective focal length of 597.77 mm. The back focus of the system is designed to compensate for the typical thickness of the stage 16 positioned adjacent the first annular Fresnel lens 1.

Magnification of the system described in Table 1 may be reduced to 1.60X by removing lenses 3 and 7, which comprise the auxiliary lens structure 30, from the optical path 32 of the system. The remaining system, which would include lenses 1, 2, 4, 5 and 6, has a back focus of 3.201 mm, an object to image distance of 1316.2 mm and is afocal in that the effective focal length is essentially infinite. In this configuration the air space between the second annular Fresnel lens 2 and the first lens 4 of the prime projection lens system 22 is found by adding together the figures for S between lenses 2-3 and 3-4 and combining the total with the thickness of lens 3. The result is an air space between the lenses 2 and 4 of 478.9 mm.

Although the present invention has been described with respect to only a single specific embodiment, it will be understood that proportional changes may be made in the lens system and not depart from the present invention as disclosed in the accompanying claims.

I claim:

1. In a dual magnification rear screen projector which successively includes along a folded light path a light source, an object stage, a condensing lens, a projection lens, and a rear projection screen upon which an image of an object located on said object stage may be projected for viewing from the side of the screen opposite said light source, the improvement which comprises:

a first auxiliary lens movable between positions out of said light path and in said light path between said condensing lens and said projection lens;

a second auxiliary lens movable with said first auxiliary lens between positions out of said light path and in said light path between said projection lens and said rear projection screen;

means for simultaneously moving said first and second auxiliary lenses between said positions out of and into said light path;

said projector providing a first magnification of said object when said first and second auxiliary lenses are out of said light path and a second magnification of said object when said first and second auxiliary lenses are in said light path; and wherein said projector is parfocal in that axial movement of said projection lens is not required for focusing said image at said projection screen in response to movement of said first and second auxiliary lenses to achieve said first or second magnifications.

2. In a dual magnification rear screen projector which successively includes along a folded light path a light source, an object stage, a condensing lens, a projection lens, and a rear projection screen upon which an image of an object located on said object stage may be projected for viewing from the side of the screen opposite said light source, the improvement which comprises:

a first auxiliary lens movable between positions out of said light path and in said light path between said condensing lens and said projection lens;

a second auxiliary lens movable with said first auxiliary lens between positions out of said light path and in said light path between said projection lens and said rear projection screen;

a housing mounting said auxiliary lenses for simultaneously moving said auxiliary lenses between said positions out of and into said light path, which housing includes an opening adapted to accept said projection lens;

said projector providing a first magnification when said first and second auxiliary lenses are out of said light path and a second magnification when said first and second auxiliary lenses are in said light path; and wherein said projector is parfocal in that axial movement of said projection lens is not required for focusing said image at said projection screen in response to movement of said first and second auxiliary lenses to achieve said first or second magnifications.

3. A projector according to claim 2 further including means for slideably mounting said housing to said projector.

4. A projector according to claim 3 wherein said means for slideably mounting said housing is a roller-bearing carriage interposed between said housing and said projector.

5. A projector according to claim 1 wherein the characteristics of said condensing lens, said projection lens, said auxiliary lenses and their spacial relationship with said auxiliary lenses in said position in said light path are sequentially as listed in the following table:

| Lens | R(mm) | T$_1$-T$_7$ (mm) | S$_1$-S$_6$ (mm) | N$_d$ | V$_d$ | Effective Focal Length (mm) |
|---|---|---|---|---|---|---|
| 1 | Plano | 2.03 | | 1.4913 | 57.8 | 418.12 |
| | * | | | | | |
| | | | 17.46 | | | |
| | ** | | | | | |
| 2 | | 2.03 | | 1.4913 | 57.8 | 362.73 |
| | Plano | | | | | |
| | | | 432.40 | | | |
| | 62.941 | | | | | |
| 3 | | 8.0 | | 1.5168 | 64.17 | 231.60 |
| | 127.001 | | | | | |
| | | | 38.5 | | | |
| | 112.047 | | | | | |
| 4 | | 12.55 | | 1.5225 | 59.48 | 109.32 |
| | −112.047 | | | | | |
| | | | 7.10 | | | |
| | −59.440 | | | | | |
| 5 | | 3.65 | | 1.5814 | 40.85 | −80.22 |
| | 221.433 | | | | | |
| | | | 6.818 | | | |
| | −99.45 | | | | | |
| 6 | | 11.12 | | 1.5311 | 62.15 | 181.87 |
| | −50.90 | | | | | |
| | | | 6.55 | | | |
| | −71.25 | | | | | |
| 7 | | 3.0 | | 1.5168 | 64.17 | −199.59 |
| | −234.048 | | | | | |

\* Equation (2) in specification where:
$C = -4.868 \times 10^{-3}$
$K = -9.0131 \times 10^{-1}$
$d = 1.41 \times 10^{-10}$
$e = 4.27 \times 10^{-15}$ \*\* Equation (2) in specification where:
$C = 5.611 \times 10^{-3}$
$K = 8.8711 \times 10^{-1}$
$d = -5.18 \times 10^{-10}$
$e = -1.01 \times 10^{-14}$ wherein the respective lenses are numbered from said light source toward said screen in the first column; the radii of curvature R of the lens surfaces are listed in the second column with lens surfaces being listed in the order light encounters the respective lens surfaces in its path from said light source to said screen, plus and minus values of R indicating lens surfaces which are respectively convex and concave to light entering the lens from said light source; the axial thicknesses T of the respective lens elements are given in the third column; the air spaces S between lenses are listed in the fourth column; the refractive indices N for the D line of the spectrum are given in the fifth column; the dispersive indices V for the D line of the spectrum are listed in the sixth column; and the effective focal lengths of the individual lenses are given in the seventh column; the quantities R, T, S and the effective focal length being expressed in millimeters to describe a lens system having a back focus of about 3.331 mm, an object to image distance of about 1316.06 mm, an overall effective focal length of about 597.77 mm and which operates at a magnification of about 2.40X.

6. A projector according to claim 1 wherein said condensing lens includes two annular Fresnel lenses adjacent said object stage and wherein said light source and the center of the Fresnel lens nearer said object stage are correspondingly offset from the center of said object stage and the center of the Fresnel lens farther from said object stage so that the reflection of said light source from said object stage is altered in direction while light transmitted through said object stage is directed along the optical axis of said Fresnel lens farther from said object stage.

* * * * *

UNITED STATES PATENT AND TRADEMARK OFFICE
CERTIFICATE OF CORRECTION

PATENT NO. : 4,561,740
DATED : December 31, 1985
INVENTOR(S) : Dennis F. Vanderwerf It is certified that error appears in the above-identified patent and that said Letters Patent is hereby corrected as shown below:

Claim 5, column 8, line 68, "sequentially" should read -- substantially --.

Signed and Sealed this

Twenty-ninth Day of July 1986

[SEAL]

Attest:

Attesting Officer

DONALD J. QUIGG

Commissioner of Patents and Trademarks